United States Patent [19]

Dutton

[11] 4,364,979

[45] Dec. 21, 1982

[54] COMPOSITION BOARD

[76] Inventor: Edward I. Dutton, 7 Cockroft Rd., Honey Hills, Florida, Transvaal, South Africa

[21] Appl. No.: 206,179

[22] Filed: Nov. 12, 1980

[30] Foreign Application Priority Data

Nov. 12, 1979 [ZA] South Africa .................. 79/6056

[51] Int. Cl.³ .............................................. B32B 5/16
[52] U.S. Cl. ........................................ 428/2; 156/62.2; 156/94; 156/296; 264/113; 264/122; 264/128; 264/DIG. 69; 52/DIG. 9; 428/326; 428/526; 428/528; 428/534; 428/535; 524/9; 524/14
[58] Field of Search ............... 264/122, DIG. 69, 108, 264/113, 112, 123, 128; 428/326, 2, 212, 524, 534, 535, 526, 528; 260/17.2, 17.4 R; 156/62.2, 296, 94; 524/9, 14; 52/DIG. 9

[56] References Cited

U.S. PATENT DOCUMENTS

| | | | |
|---|---|---|---|
| 2,319,182 | 5/1943 | Van der Pyl | 428/323 |
| 2,440,789 | 5/1948 | Van der Pyl | 260/17.4 |
| 3,686,384 | 8/1972 | Runton | 428/323 |
| 3,793,125 | 2/1974 | Kunz | 428/326 |
| 3,927,235 | 12/1975 | Chow | 428/302 |
| 3,956,555 | 5/1976 | McKean | 428/326 |
| 3,968,294 | 7/1976 | Robitschek et al. | 428/323 |
| 4,097,648 | 6/1978 | Pringle | 260/17.2 |
| 4,203,876 | 5/1980 | Dereppe | 260/17.4 R |
| 4,225,640 | 9/1980 | Erb | 264/122 |
| 4,234,658 | 11/1980 | Chow | 264/122 |
| 4,246,310 | 1/1981 | Hunt et al. | 428/326 |
| 4,279,790 | 7/1981 | Nakajima | 260/17.4 |

FOREIGN PATENT DOCUMENTS

| | | | |
|---|---|---|---|
| 1182805 | 12/1964 | Fed. Rep. of Germany . | |
| 1660460 | 1/1971 | Fed. Rep. of Germany . | |
| 1653133 | 3/1972 | Fed. Rep. of Germany . | |
| 2821219 | 11/1979 | Fed. Rep. of Germany . | |
| 598785 | 9/1945 | United Kingdom | 260/17.2 |
| 1127700 | 9/1968 | United Kingdom . | |

Primary Examiner—Stanley S. Silverman
Attorney, Agent, or Firm—Cushman, Darby & Cushman

[57] ABSTRACT

Particle board contains, as a fibrous material with good structural properties, at least a proportion of chicory root particles. Preferably the chicory is mixed with bagasse fibres to provide strength to the board, and a filler in the form of coffee grounds is included. The coffee and chicory constituents are conveniently obtained as wastes from the manufacture of instant coffee.

24 Claims, No Drawings

COMPOSITION BOARD

BACKGROUND OF THE INVENTION

This invention relates to a composition board and particularly to a particle board of the general type widely used in the construction and furniture industries and in other industrial and domestic applications.

Several forms of particle board are known. Those of the highest quality in terms of strength, stability, durability, and certain other features traditionally comprise a mixture of wood chips (usually a softwood), a filler material, and a binder. There may also be other constituents. The wood chips, which are generally in form of flakes that are largely superimposed on each other in the plane of the board, supply structural strength and certain characteristics such as the ability to receive screws. These characteristics arise from the fibrous nature of the chip material, with the fibres having a linear characteristic and the fibres in each particle being substantially parallel to one another.

The filler material has virtually no structural strength but provides bulk and lends consistency to the board. The traditional filler material is sawdust, which is cheap and readily available and has generally suitable physical and chemical properties.

The binder or glue may be of many types, the common modern types being chiefly phenolic resins and the more economical urea formaldehyde. Other substances, particularly thermosetting resins or even thermoplastic resins, with the possible addition of other constituents to provide special features, are also commonly used. The cost of the modern resins in high-quality particle boards may be as much as 75% or more of the total cost of the materials.

Numerous attempts have been made to reduce the cost of the traditional particle board, particularly in recent years when the cost of lumber (which is used in the form of round logs in the manufacture of high-quality particle board to provide the structural chips) and resin has been steadily rising. These attempts have centred largely around the introduction of cheaper materials.

As a substitute for wood chips, begasse has been resorted to on a large scale, and various grades of bagasse board are now established products in many countries. Bagasse is available cheaply as a waste product from sugar mills and is hence far cheaper than logs. It has however certain disadvantages, one of them the fact that it is less dense than wood and requires expensive machinery to compress it satisfactorily. Further it is accompanied by a substantial quantity of pith which is structurally weak and must be removed. It also requires more resin than do wood chips to bind it in the finished board, so that the binder component becomes more costly and the board, being more resinous, is also less easily worked by conventional woodworking tools. Generally, boards containing a relatively high bagasse content are in the lower quality range of particle boards.

Numerous vegetable waste materials have been used as filler materials or as other constituents of particle boards. Among those materials described in the prior art are coffee beans and coffee grounds. Coffee is an endocarp which, at least after it has been roasted, is hard and tough. In the manufacture of instant coffee, the beans are roasted, ground and processed to remove the soluble solid content. The resultant particles still contain a relatively high oil content and do not readily absorb binder resins, so that the usefulness of coffee as a filler substance is generally limited in products such as particle board. Particle boards with a high coffee content would in fact normally be among the lower quality grades. Coffee grounds are however available in substantial quantities as a waste product which is usually dumped or incinerated to dispose of it. Attempts have been made to use certain thermoplastic properties which coffee possess at high temperature and pressure in order to mould it as a structural material in its own right (as described for instance in U.S. Pat. No. 3,686,384 of Leslie A. Runton), but these temperatures and pressures are higher than those conveniently available in conventional equipment for manufacturing particle board.

Considerable efforts have also been made to use other endocarps and the shells, husks, barks, and stalks of many plants as constituents of pressed or moulded products, often in the form of a flour which has certain thermoplastic or thermosetting properties as well as being a filler, carrier or extender or the like. Examples of such materials (including coffee in some cases) are described in, for instance, U.S. Pat. Nos. 2,319,182 and 2,440,789 of Edward van der Pyl, and other lignocellulosic materials in U.S. Pat. No. 3,968,294 of Paul Robitschek et al.

An example of a particle board utilising materials which are commonly regarded as wastes is described in U.S. Pat. No. 3,927,235 of Poo Chow. In this patent the board is described as a laminate structure in which a central core contains, as a major ingredient, plant material obtained from a part other than the stalk. Coffee beans are among the materials mentioned as such a constituent. The two surface layers are on the other hand composed mainly of a stalk material such as bagasse. Urea formaldehyde is mentioned as a suitable binder material. This board, while being potentially inexpensive compared with the traditional wood particle board, would not be of high quality if it contained coffee since its central core, with more than 50% coffee, would be structurally weak, the coffee particles lacking the bonding and fibrous properties that are present in the wood chips used in traditional high-quality boards.

SUMMARY OF THE INVENTION

An object of the invention is to provide a particle board which may embody a high proportion of vegetable materials that are regarded as industrial waste products and which nevertheless has good structural and other properties so that the board will be ranked, even in contries where a wide range of particle boards is available, as a high-quality product.

Another object is to exploit, in the manufacture of particle board, a material which has hitherto been overlooked although it is cheaply available in large quantities in many countries.

Other objects will be apparent from the description which follows.

According to the invention a particle board comprises a body of structural particles bonded together by a binder, the structural particles consisting at least partly of chicory root particles. A filler material may conveniently be included.

The invention is based on the surprising fact that chicory roots have been found to have excellent properties for inclusion in particle board. Such properties include the strength and consistency of the fibres, stability and durability, toughness, rigidity, compressibility, and the capacity to bond with certain suitable resins and the capacity to be worked in the finished board by conventional woodworking tools.

It has also surprisingly been found that the mixture of coffee grounds and chicory waste emanating from many manufacturers of instant coffee can be used, either in the proportions in which the mixture is discharged from the manufacturing plants or in easily adjusted proportions, to provide a combination of a structural particle and a filler for making a high-quality particle board.

In fact the properties of chicory are such that, provided suitable proportions are used and provided the manufacturing processes are properly controlled, bagasse can be used with the chicory as complementary structural particles in a high-quality board. The use of a mixture of chicory and bagasse, with coffee particles as a filler and urea-formaldehyde as a binder, is in fact a preferred combination, and results in a low-cost board with highly acceptable properties.

Precautions should be taken to ensure that the chicory is properly employed in the manufacturing process, and to this end it has been found important to dry and to size the chicory particles suitably, and to ensure that the binder is suitably applied to them to achieve a uniform coating and to ensure that the binder is absorbed into the fibres.

Accordingly, another aspect of the invention provides a method of making a particle board comprising the steps of applying a binder to particles of a structural material consisting at least partly of chicory root particles, pressing the mixture to form a board, and causing the binder to set and bind the materials together in the board.

The binder in this process may conveniently be urea formaldehyde in solution with hardeners such as ammonia and ammonium chloride. This solution is applied to the other materials while they are in a dehydrated state so that it increases their moisture content to substantially the ambient content or even higher. Heat and pressure are then applied to the mixture to form the board and to cause the binder to set.

Chicory (*cichorium intybus*) is a shrub with a large taproot. In instant coffee factories, the roots are washed and crushed to some extent, generally to form flakes, and the soluble solids are extracted from them. A proportion of chicory is usually mixed with the coffee beans and processed with them in a hot extraction process, the chicory acting as a catalyst or otherwise enhancing the operation of removing soluble solids from the coffee. Another portion of the chicory is usually processed cold to extract its soluble solids. The spent coffee grounds and spent chicory particles are then available as waste materials. In countries where dumping is not permitted they are often incinerated, usually with the admixture of coal, so that the wastes are generally a liability to the manufacturer of the instant coffee. The coffee particles emerge as a hot, moist waste product and the chicory in a pulp containing some 75% water by weight, or the coffee and chicory particles may emerge mixed in a watery pulp. The chicory particles are typically flakes of 1 mm to 8 mm in diameter and 1 mm to 2 mm in thickness. The coffee particles are mainly grounds whose largest dimension may be 2 mm or less.

DESCRIPTION OF EMBODIMENTS OF THE INVENTION

In the process developed by the applicant, the coffee grounds and chicory particles are received from manufacturers of instant coffee in the form of the above-mentioned wastes, the coffee generally comprising between 25% and 50% by weight of the solid content. Although particle boards free of coffee or any other filler can be made, it is generally unnecessary to avoid the presence of the filler and consequently the applicant normally mixes the chicory and coffee wastes to arrive at a pulp in which the solid content is composed of between 50% and 75% chicory. As noted above, this proportion corresponds to that in which the waste mixture is available from the instant coffee manufacturers.

The mixture (which at the outset has a water content of about 75%) is then treated in a conventional screw press to reduce the water content to about 50% by weight. It is then fed into a drier (which may be a paddle or tunnel or other drier, a rotary drier having been found highly satisfactory) and the water content is further reduced. Although it is possible to produce an acceptable board if the water content is reduced at this stage to about 12% by weight (which corresponds approximately to ambient moisture content of such products in coastal zones) it is desirable to continue the drying until the moisture content is as low as 3% or 4%. The temperature in the drier is maintained at about 250° C.

The dried particles are then passed over a screen having 1.5 mm apertures to divide the particles into a coarse and fine stream. This division is made with a view to ensuring that in the finished board the finer particles will be at the surfaces and the coarser particles generally at the centre, and as is described below the apparatus generally used requires these particles to be delivered separately. If certain modern pneumatic equipment is used, however, the screening will not be necessary since the pneumatic equipment, by blowing the particles in a trajectory in which they tend to separate by size automatically, achieves the same result.

At this stage the applicant mixes the chicory-coffee particles with bagasse.

The bagasse arrives from a sugar mill or diffuser in bales of moist bundles of fibre and pith. It is necessary to detach the pith from the fibre and ultimately to remove the pith. The applicant commences this in the course of initial drying of the bagasse, which takes place in a rotary drier in which the temperature is not greater than about 250° C. The combustion of the pith in the drier is avoided because of the action of the air stream, which rapidly removes the pith. The fibre particles have a longer residence time, and are dried down to a moisture content of slightly less than 30%. The larger particles are collected in a conventional discharge hopper, the smaller particles being collected in a pneumatic cyclone.

The drier product is then mixed and fed into a hammer mill to separate further the pith particles from the fibre and to reduce the larger particles in size. In practice the applicant uses a hammer mill in which the hammers are wider than 5 mm less than 19 mm in width, rotating at about 3000 rpm, the mill having a screen with apertures of 9 mm.

The milled product is then passed over a screen having apertures of about 0.5 mm, the fine product being discarded for the purposes of particle board manufacture since it is largely pith. (In practice this product is useful in certain animal fodders.) The oversize stream, consisting almost entirely of fibre, is dried in a rotary drier to reduce the moisture content below 12% and preferably to about 3% to 4%. Finally the bagasse is screened on a screen with 2 mm apertures to provide a coarse and a fine stream for later use.

The dried and sized bagasse particles are now mixed with the chicory and coffee particles, and the binder is applied to them.

The binder preferred by the applicant for interior board is a solution of the following composition, prepared by conventional methods:

| | |
|---|---|
| Urea formaldehyde (66,5% solids) | 75,5% |
| Ammonia solution | 1,0% |
| Ammonium chloride | 1,1% |
| Water | 21,4% |
| | 100,0% |

The ammonia and ammonium chloride function as hardeners in relation to the urea formaldehyde resin.

In a preferred form, for boards intended for interior use, the following procedures follow.

Mixing now takes place of the materials intended for the inner core of the board. For this component 32 units (by weight) of the coarse bagasse fibre mentioned above is mixed with 33 units of the coarse chicory/coffee particles also mentioned above, and the resulting mixture of solids is then mixed with 5 units of the binder solution. The binder solution is applied in the form of a fine mist which is sprayed on to the solids while they are being continuously agitated. This process takes place in a mixing chamber in which the conditions are carefully controlled to ensure that every solid particle is coated with the binder solution, which is immediately absorbed into the fibres of the solids because of their dryness. The particles remain dry to the touch even after receiving this coating.

For the surface layers of the board, 20 units of the bagasse fines are mixed with 15 units of the chicory/coffee fines and coated with 5 units of the binder solution. This results in a higher resin to solids ratio in the surface layers than in the inner core of the board. The surface layer component is divided into two equal streams and these streams, between which the stream of coated coarser particles is interposed, are then deposited in sequence on to a moving caul plate. It has been found suitable to deposit the mixture from endless belt conveyors equipped with spreaders to ensure even distribution. The three layers are superimposed to depths dependent upon the thickness required in the finished board.

The loaded caul plates are transferred into a conventional multi-daylight press where they are subjected to a pressure of about 25 MPa and a temperature of about 200° C. for a time dependent on the thickness of the board. For a 12 mm board the residence time is about 4.5 to 5 minutes, depending upon the ambient temperature at the time. Longer residence periods are needed for thicker boards.

The board when removed from the press and cooled is subjected to conventional trimming and sanding to cut it to the required size and to impart the desired smoothness to the surfaces.

A typical 12 mm board produced by the above-mentioned process was subjected to the standard test procedures laid down in British Standard 5669, with the following result:

| | |
|---|---|
| Modulus of rupture | 23 MPa |
| Modulus of elasticity | 2500 MPa |
| Surface bond | 0,99 MPa |
| Internal bond | 0,87 MPa |
| Screw-holding strength, straight face | 760 N |
| Screw-holding strength, straight side | 610 N |
| Moist swelling | 10% to 12% |

These results are, as will be clear to those familiar with the corresponding figures for conventional boards, highly acceptable and imply that the particle board of the invention is superior in several important respects to conventional boards. For instance, the screw-holding strength, (straight face) for conventional softwood chipboard is usually about 480 N and the corresponding strength (straight side) about 360 N. A moist swelling factor of 12% to 15% is common in conventional boards.

Variations of the procedures described above are of course possible. For instance, if an exterior board is required, the binder composition may differ from that set out by the substitution of about 10% of the water content by a standard wax emulsion.

It is possible to use, instead of urea formaldehyde as the resin in the binder, a phenol aldehyde, or other glues or natural or synthetic resins. In principle the binder may be either cold-setting or hot-setting, but the hot-setting binders are generally substantially cheaper to use.

The binder compound may be used in powder form rather than in solution to coat the other materials, but this possibility, allowing the use of cheaper equipment, is more labour-intensive and hence not suitable for all countries.

It is possible to produce a particle board according to the invention in which chicory is the only structural material, and even possible to omit a filler from the board. This produces a board with a highly attractive appearance since the chicory is a rich brown colour, with visually interesting tone variations. This board can be used for instance as a surface material for interior decoration, or as a ceiling tile with good acoustic and decorative properties. However such a board does not have great rupture strength since the chicory fibre is comparatively short in relation to bagasse and timber, which consequently have substantial linear fibre strength.

For this reason, it is advisable to supplement the chicory with another structural particle, such as bagasse or timber, if a general-purpose structural board is required. If filler materials are omitted an extremely high-quality structural board may be composed of a mixture of chicory and bagasse or timber particles in the proportion 48:52 (chicory to bagasse/timber). However a perfectly acceptable structural board in which fillers are absent may have a chicory content of 25% to 75% by weight of the structural particles. Similar proportions apply if the board includes a filler, but for good structural properties the filler content should not exceed about 50% of the total weight of the board, and preferably should be less than about 20%. A preferred figure is about 12.5%.

The bagasse mentioned above as a complementary structural fibre in the board of the invention can be eliminated or replaced in a suitable proportion to the chicory content by a material such as timber, bark, twigs, grass, pineapple rinds or the stalks of plants such as grapes. A fibre with good linear strength is required.

Also, a filler other than coffee may be used. Sawdust and other vegetable products are acceptable in certain applications.

Naturally the specific properties of the resultant board will depend on the nature of the materials used and other factors.

I claim:

1. A particle board comprising a body of structural ligno-cellulosic particles and filler material bonded together by a binder, said structural particles comprising of at least about 25% chicory root particles and said filler material being selected from the group consisting of coffee grounds, sawdust and vegetable products and comprising less than approximately 50% by weight of the finished board.

2. The particle board of claim 1 including a proportion of complementary structural particles which have substantial linear fibre strength.

3. The particle board of claim 2 in the complementary structural particles are bagasse.

4. The particle board of claim 1 in which the filler is coffee grounds.

5. The particle board of claim 1 in which the binder is urea formaldehyde.

6. The particle board of claim 1 in which the chicory comprises up to 75% by weight of the total structural particles.

7. The particle board of claim 6 in which the chicory comprises approximately 48% by weight of the total structural particles.

8. The particle board as claimed in claim 1, 2, 3, 6 or 7, wherein the board has a central core in which the structural particles are coarser than the structural particles in layers adjacent the surfaces of the board.

9. The particle board of claim 1 in which the filler comprises about 12.5% by weight of the finished board.

10. A method of making a particle board comprising the steps of taking a mixture of ground coffee and chicory root and making up a pulp with coffee and chicory root in the ratio of 50 to 70% chicory root, reducing the water content to between 3% and 12% by weight to form a mixture of dried particles, separating the dried particles into a coarse stream and fine stream, respectively, mixing the dried particles with coarse and fine particles of bagasse, adding binder to the mixtures, forming the particle board with the coarse mixture as a central core and the fine mixture at either side thereof said coarse mixture containing at least about 25% chicory root particles, and finally applying heat and pressure to the board.

11. A method according to claim 10, in which the step of reducing the water content of the pulp is carried out first by pressing and then by drying.

12. A method according to claim 10 or 11, in which the binder is added by spraying a fine mist of binder onto the mixtures.

13. A method according to claim 10 or 11, in which the dry particles are separated by passing them over a screen, the fine particles passing through the screen.

14. A method according to claim 10 or 11, in which the dry particles are separated by passing them over a screen having a mesh size of 1.5 mm, the fine particles passing through the screen.

15. A method according to claim 10, in which the binder is formed principally of urea formaldehyde.

16. A method according to claim 15, in which the binder is added in the form of a dry powder.

17. A method for the manufacture of particle board comprising the steps of forming a mixture of ligno-cellulosic structural particles and filler material, applying a binder to said mixture, pressing the mixture to form a board, and causing the binder to set and bind the materials together in the board, wherein said structural particles comprise at least about 25% of chicory root particles and said filler material being selected from the group consisting of coffee grounds, sawdust and vegetable products and comprising less than 50% by weight of the finished board.

18. The method as claimed in claim 17 including the step of including in said mixture a complementary structural material having substantial linear fiber strength.

19. The method as claimed in claim 18 wherein said complementary structural material is bagasse.

20. The method of claim 17 in which the structural particles are dried, before the application of the binder, to an extent such that their moisture content is below the ambient moisture content of similar materials, and the binder is applied in liquid form.

21. The method of claim 17 in which the filler material is coffee grounds.

22. The method of claim 17 in which the chicory comprises up to 75% by weight of the total structural particles.

23. The method of claim 22 in which the chicory comprises approximately 48% by weight of the total structural particles.

24. The method of claim 17 in which the filler material comprises approximately 12.5% by weight of the finished board.

* * * * *